United States Patent [19]

Chalmers

[11] 4,406,479
[45] Sep. 27, 1983

[54] VEHICLE SUSPENSION INCORPORATING CROSS-OVER LINKS

[76] Inventor: Wallace G. Chalmers, 2 Gloucester St., Ste. 214, Toronto, Ontario, Canada, M4Y 1L5

[21] Appl. No.: 306,832

[22] Filed: Sep. 29, 1981

[30] Foreign Application Priority Data

Sep. 2, 1981 [CA] Canada .................................. 385072

[51] Int. Cl.³ .............................................. B60G 5/00
[52] U.S. Cl. ..................................... 280/678; 280/711
[58] Field of Search ............... 280/104, 678, 683, 685, 280/788, 689, 711, 713, 705, 725

[56] References Cited

U.S. PATENT DOCUMENTS

| | | | |
|---|---|---|---|
| 2,290,620 | 7/1942 | Brown | 280/711 |
| 2,814,480 | 11/1957 | Clark | 280/711 |
| 2,865,650 | 12/1958 | Chalmers | 280/678 |
| 2,970,848 | 2/1961 | Rice | 280/711 |
| 3,003,781 | 10/1961 | Black | 280/711 |
| 3,066,948 | 12/1962 | Cain | 280/678 |

Primary Examiner—Robert R. Song
Attorney, Agent, or Firm—Arne I. Fors; Robert F. Delbridge

[57] ABSTRACT

An axle suspension system for a vehicle including a pair of torque rods splayed or outwardly angled relative to the longitudinal axis of the vehicle in which the torque rods cross each other and are flexibly connected to the vehicle chassis at their outer ends and flexibly connected to an axle at their inner ends, typically at a level above the axle corresponding to the level of and in proximity to the roll center of the vehicle chassis. In one embodiment, one of said torque rods curved upwardly in a vertical plane crosses the other of said torque rods curved downwardly in a vertical plane whereby interference between them is avoided. In another embodiment, one of the torque rods passes through an enlarged opening in the other torque rod to avoid interference between the torque rods.

13 Claims, 8 Drawing Figures

VEHICLE SUSPENSION INCORPORATING CROSS-OVER LINKS

BACKGROUND OF THE INVENTION

This invention relates to improvements in heavy duty vehicles and in particular to improved means for providing accurate and structurally sound guidance of vehicle axles while permitting substantial vertical axle travel relative to the frame during articulation over rough terrain.

A common method of locating and guiding an automotive rear axle is by use of the so-called 4-link system. There are two horizontal longitudinal links (often called "torque rods") mounted below the axle, and two horizontal splayed upper ones which diverge away from one another at equal angles to the longitudinal axis of the frame. These upper rods not only complete the parallelogram with the lower ones, as viewed from the side, but by angle-mounting them in plan view they will resist lateral or transverse axle forces and movement at the level at which they are attached. (This level on the axle, always at the centre-line of the vehicle, is known as the "roll-centre", as it is the centre about which the body rocks or rolls relative to that axle.)

Heavy trucks commonly have frame widths between 30 and 34 inches. There is thus very limited lateral space in which to locate splayed rods. If the rods are to be kept to a reasonable length, if the degree of rotary movement at the bushings is to be kept within acceptable limits, and if the swing arcs of the rods are to be kept relatively flat, the included or splay angle $\theta$ as measured in a horizontal plane between the two upper rods must be reduced. This is fine geometrically but unfortunately it results in higher loads on the rods and their bushings and brackets for any given transverse axle load. This is based on a consideration of the triangle of forces. Thus, for the force triangle ABC, the force represented by side AC=transverse axle load or force, while for the other two sides AB=BC=rod load. If the splay angle between the rods $\theta=60°$, the force triangle is equivalent and thus the 3 forces are equal. If $\theta$ is less than 60°, the rod load is greater than the transverse load.

If the splay angle $\theta$ were increased well beyond 60° to, say, about 90°, it can readily be seen that the new shape of triangle drastically reduces the rod loads. However, the narrow truck frame width, as used on heavy trucks, restricts the rod length permissible with this relatively large splay angle. Also, the longitudinal or effective length of these short rods is only about 71% of their eye-to-eye length. The limitation imposed on the maximum swing arc length restricts the vertical travel possible by the axle.

Thus, it can be seen that with conventional 4-link systems incorporating a pair of splayed upper rods that in practice a compromise must be arrived at. While it is desirable to increase the splay angle to reduce the loadings referred to above, such increase in angle reduces the effective rod length together with the vertical axle travel.

Another type of system for locating an axle of a heavy duty vehicle utilizes one longitudinal torque rod and one transverse "Panhard" or track rod. The two rods are located at 90° to each other in plane view. The longitudinal rod absorbs all the upper torque forces and transfers them to a crossmember in the frame. The transversely oriented panhard rod (having one end attached to a frame main rail and another to a bracket on the axle) swings in an arc, as viewed from the front or rear, preventing a symmetrical suspension. Due to the limited swing radius of the panhard rod there can be considerable lateral movement between the axle and the frame. Also, all the transverse forces are transferred via the panhard rod to the one frame mainrail to which it is attached, creating local stress problems. Additionally, for the same transverse force, the load on the panhard rod is about 41% greater than the load experienced on the previously described splayed rods when the latter have an included angle of 90°.

SUMMARY OF THE INVENTION

It will therefore be seen that both of the above described prior art systems are subject to various restrictions and deficiencies and accordingly it is a basic object of the present invention to provide an improved suspension arrangement providing accurate and structurally sound guidance of a vehicle axle while permitting a substantial degree of vertical axle travel relative to the frame during articulation over rough terrain.

The improved suspension provided according to the present invention is similar to the first system mentioned above in that the splayed rods are symmetrically located relative to the longitudinal axis of the frame; however, by shaping the rods in a special manner they can be made to cross over and under each other thus allowing them to have a longer effective length than permitted in the prior art devices while at the same time the included angle between such rods is kept relatively large (e.g. at 80° to 90°). In other words the unsatisfactory compromise between splay angle and effective rod length required to be made in the prior art is no longer necessary and furthermore the advantages inherent in a symmetrical suspension arrangement are present.

Accordingly, the invention in one aspect provides an axle suspension system for load carrying vehicles including a load carrying chassis defining a central longitudinal axis. Axle means are positioned transversely across the chassis and are adapted to carry wheels at their outer ends. Resilient means between the axle means and the chassis transmit vertical loadings therebetween. Torque rod means are flexibly connected between the axle means and the chassis for resisting transverse and longitudinal loads imposed upon the axle means. Said torque rod means includes a first pair of rods disposed generally below the level of the axle means and a second pair of rods above such level. The rods of one of these pairs are arranged in splayed or outwardly angled relation with respect to the longitudinal axis of the chassis with each of the outwardly angled rods having an outer end flexibly connected to the chassis and an inner end flexibly connected to the axle. The invention is characterized in that the outwardly angled rods cross one another between their respective inner and outer ends so that the inner end of each rod is on a side of a vertical plane lying in the longitudinal axis opposite to that of its outer end. The outwardly angled rods are also arranged to avoid interference with one another during vertical travel of the axle means relative to the chassis.

Typically, the outwardly angled rods are located at a level above the axle means.

The inner ends of the outwardly angled rods are typically connected to the axle at a level corresponding to the roll center of the chassis relative to the axle means.

Preferably, the above recited suspension takes the form of a tandem axle suspension. In this case the axle means comprises a pair of spaced axles, with each of the axles having both the first and the second pairs of rods respectively connected thereto. The resilient means between the axle means and the chassis include equalizing beam means extending longitudinally on each side of the chassis between end portions of the axles. Suspension spring means are interposed between the chassis and the equalizing beams which are both axially compressible and capable of flexure to permit the equalizing beam means to tilt and follow the vertical movements of the wheels.

Typically, the inner ends of said rods are connected to said axle at the same level via an upstanding post rigidly affixed at the mid-point of such axle.

In the preferred form of the invention the outwardly angled rods are at equal angles relative to said medial axis and have an included angle between them of from about 80° to 90°. In one embodiment one of the outwardly angled rods is curved in a vertical plane in one direction while the other of the outwardly angled rods is curved in a vertical plane in the opposite direction whereby interference between them is avoided. In another embodiment, one of the outwardly angled rods passes through an enlarged opening formed in the other of the outwardly angled rods to avoid interference between the said rods.

BRIEF DESCRIPTION OF THE VIEWS OF DRAWINGS

The various features of the invention will be further apparent by reference to the following detailed description and drawings of a preferred embodiment of same in which.

DETAILED DESCRIPTION OF PREFERRED EMBODIMENT

Figure 1:
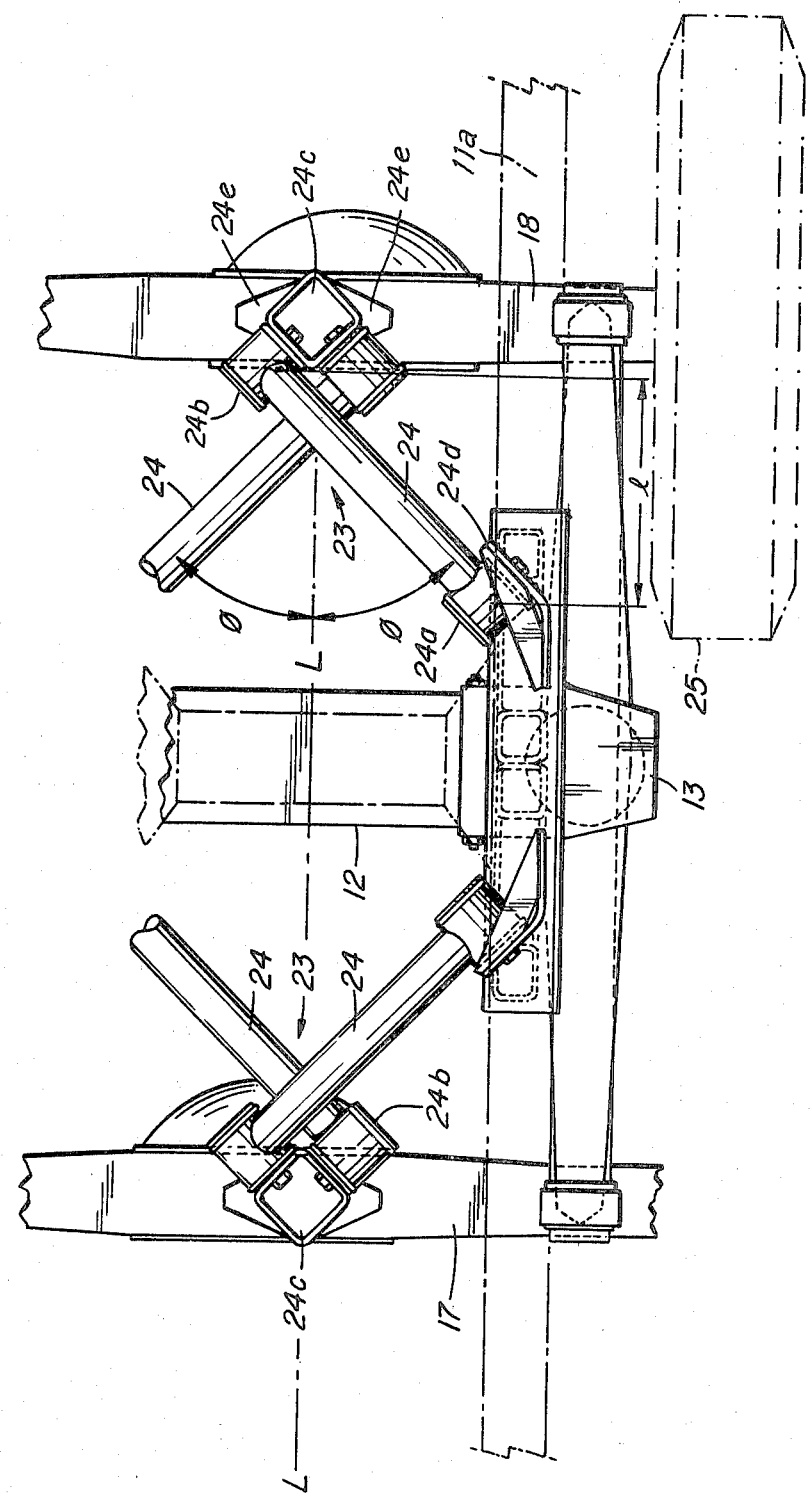
FIG. 1 is a plan view of a road vehicle chassis, embodying a tandem axle suspension system incorporating the present invention.

Particular reference will now be made to FIGS. 1, 2 and 3, in which substantially rectangular chassis frame 11 includes longitudinally extending main rails 11a, transversely extending upper cross-member 12 and symmetrical side extensions 13 and 14 extending in line with cross-member 12.

The components of this suspension system are symmetrical about the longitudinal centre line L of chassis 11 and about upper cross-member 12; thus, many symmetrical components are omitted for clarity of illustration.

A triangular shaped space frame extends below, and is rigidly attached to main rails 11a and comprises downwardly converging side members 15 forming a triangle on each side of chassis 11, and connected and stabilized at their lower ends by lower cross-member 16.

Tandem axles 17 and 18 are longitudinally located by lower longitudinally extending oppositely directed pairs of torque rods 19 which are pivotally connected at their ends to brackets 20 and 21 on axles 17 and 18, respectively, and brackets 22 on lower cross-member 16.

The tandem axles 17 and 18 are further longitudinally located, above the horizontal centre lines of the axles, by respective upper torque rod assemblies 23, each of which comprises a pair of upper torque rods 24 arranged and connected in a manner to be described hereafter. It is sufficient to state here that axles 17 and 18 are stabilized longitudinally by lower torque rods 19 and upper torque rod assemblies 23, the latter also providing complete transverse stabilization for axles 17 and 18.

Figure 2:
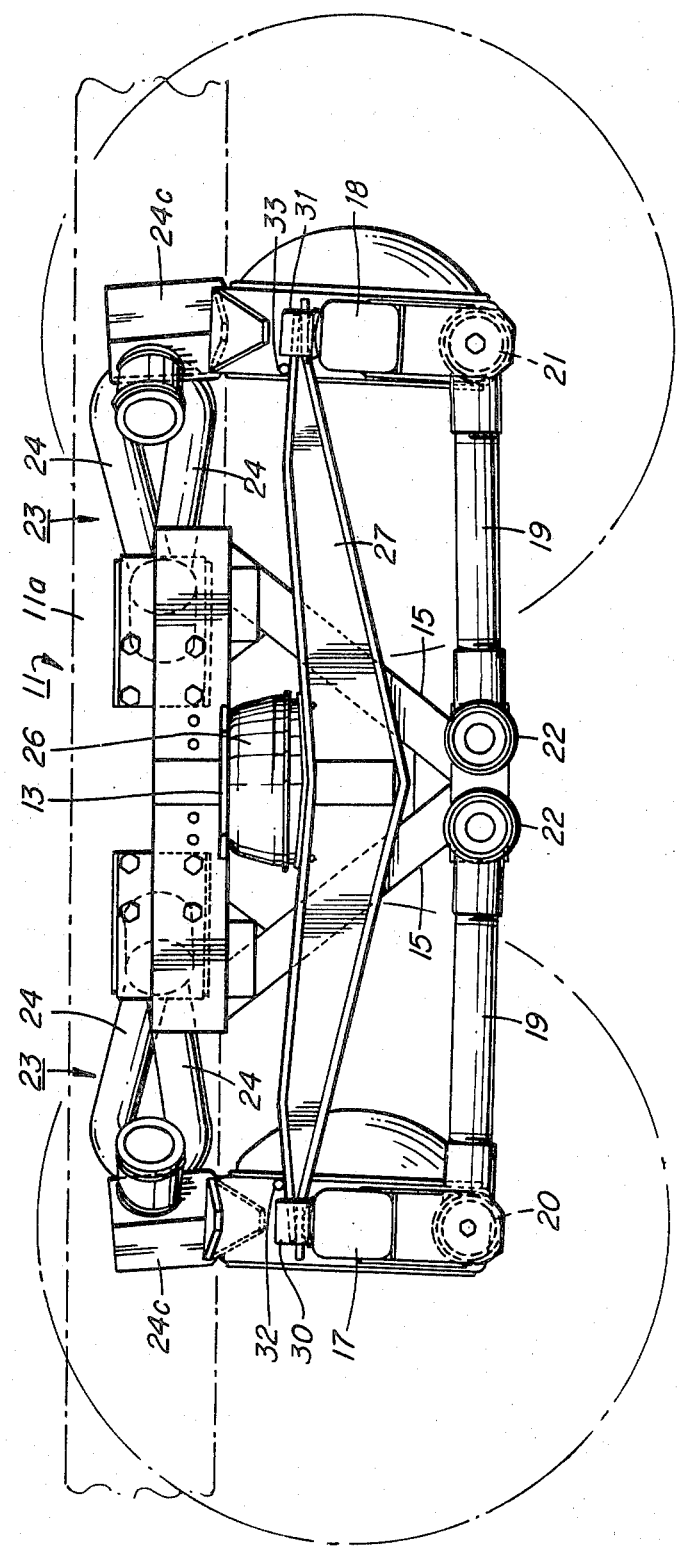
FIG. 2 is a side elevation of the road vehicle chassis and suspension system shown in FIG. 1.

FIG. 2 shows that upper torque rod assemblies 23 and lower torque rods 19 are approximately horizontal and in parallel relation when viewed from the side, and thus they form a parallelogram capable of effectively absorbing and resisting the torque from engine power or braking.

Figure 5:
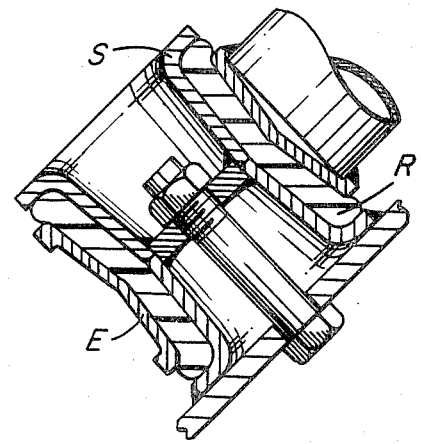
FIG. 5 is a section view of a typical joint assembly for a torque rod.

In the present embodiment the pivot connections of the upper torque rod assemblies 23 to axles 17 and 18 and upper cross-member 12, and the pivot connections of the torque rods 19 to brackets 20, 21 and 22, employ rubber bushings. The torque rod ends each comprise an eye portion (E) surrounding a spigot part or parts (S), the latter being bolted to the relevant frame or axle portion, with the annular rubber bushing R being disposed between eye E and spigot (S) is shown for example in FIG. 5. Rubber bushing R is of adequate capacity and allows sufficient free movement to allow the suspension components to move freely as each wheel 25 independently follows uneven road contours.

The vehicle load is transferred from chassis side extensions 13 and 14, through compression springs 26, to two walking beams 27 positioned longitudinally on each side of chassis 11.

Walking beams 27, in turn, distribute the load equally to the ends of axles 17 and 18, upon which they rest. In the present embodiment a compression spring 26 is rigidly attached at each side of chassis 11, to the side extension 13 and 14 and are located at the centre portions of their associated walking beams 27. Compression springs 26 are laterally flexible and thus permit walking beams 27 to tilt or rock therewith to follow the vertical movements of wheels 25. The ends of walking beams 27 are slidably supported on the upper end surfaces of axles 17 and 18 and are restrained in a vertical direction by guides 30 and 31 secured to axles 17 and 18, respectively, and in a longitudinal outward direction by stops 32 and 33 on the upper end surfaces of walking beams 27. Thus walking beams 27 are located at their ends by axles 17 and 18 and are not attached to chassis 11, so that they are, in effect, "floating" as they move up and down while compressing springs 26.

Figure 3:
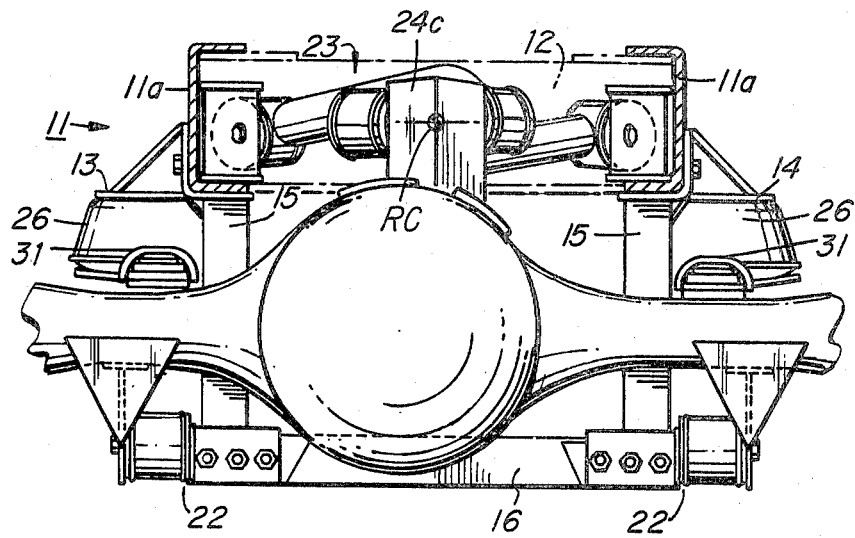
FIG. 3 is an end elevation view of the road vehicle chassis and suspension system shown in FIG. 1.

In the embodiment shown in FIGS. 1 to 3, springs 26 are of the hollow rubber type which provide the required cushioning, have a variable spring rate, and are self-damping to obviate vertical bounce. Hollow rubber springs of adequate capacity are readily available on the market and need not be further described here.

Figure 4:
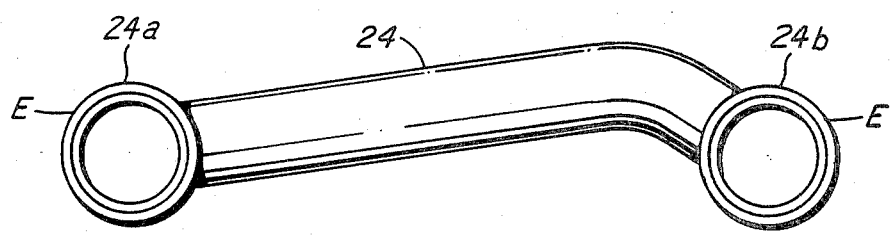
FIG. 4 is a side view of one of the curved upper torque rods.

The previously mentioned upper torque rod assemblies 23 will now be described in greater detail. It will be seen from FIG. 1 that the torque rods 24 of each pair are in outwardly angled relation ($\theta$) with respect to the longitudinal axis L of the chassis. Each of the outwardly angled rods 24 has an outer end 24a pivotally connected to the chassis at bracket 24d adjacent main rail 11a and an inner end 24b pivotally connected to its associated axle by a tower bracket 24c. The notable feature of the arrangement is that these outwardly angled upper torque rods 24 of each pair cross over one another between their respective inner and outer ends 24b, 24a so that the inner end 24b of each rod is on a side of an imaginary vertical plane (lying in said longitudinal axis L) opposite to that of its outer end 24a. Each rod 24 is arcuately contoured (see FIG. 4) by the same amount, one with the curve installed "up" and the other with the curve installed "down" so that the rods 24 do not interfere with one another as the axles move up and down relative to the chassis. The inner ends 24b of each rod, it will be noted, are connected to the associated axle 17, 18 by means of an upstanding tower bracket 24c connected in alignment with the mid-point of the axle with the points of connection of the inner ends 24b of the rods being at the same level as and immediately adjacent to the roll center RC of the chassis relative to the axles.

Figure 6:
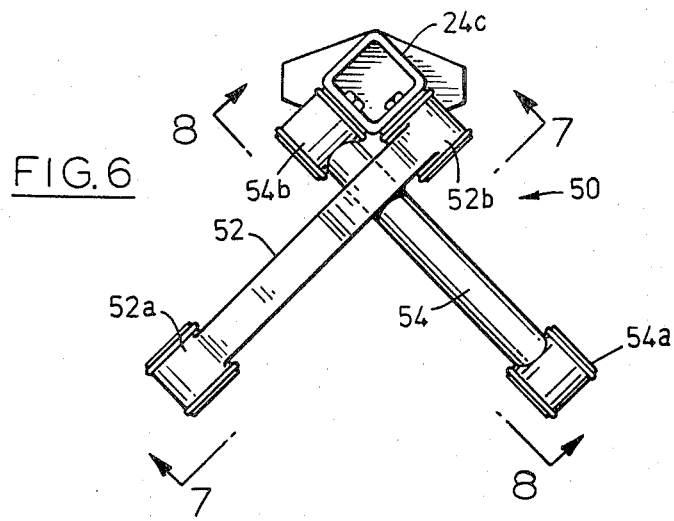
FIG. 6 is a plan view of a further embodiment of my invention.
Figure 7:
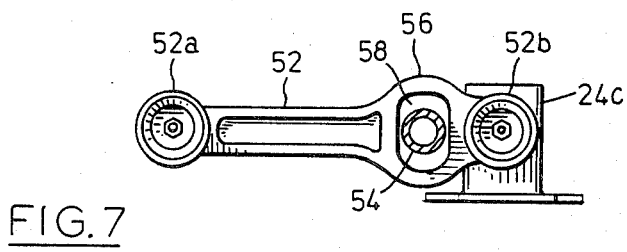
FIG. 7 is a side elevation of the embodiment shown in FIG. 6 taken along line 7—7 of FIG. 6.
Figure 8:
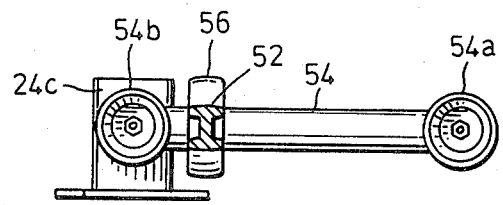
FIG. 8 is a side elevation taken along line 8—8 of FIG. 6.

The embodiment of my invention illustrated in FIGS. 6-8 comprises torque rod assemblies 50 having rods 52, 54 of each pair in outwardly angled relation ($\theta$) as described above. Each of the outwardly angled rods 52, 54 has an outer end 52a, 54a pivotally connected to the chassis and an inner end 52b, 54b pivotally connected to its associated axle by tower bracket 24c. Rod 52 has an upset portion 56 of enlarged cross-section in proximity to end 52b at the point of intersection of rods 52, 54 with vertically elongated opening 58 formed therein to loosely receive rod 54. Rod 54 may be a straight length of tubular section.

This embodiment allows rods 52, 54 of each assembly 50 to cross each other between their respective inner and outer ends 52a, 52b and 54a, 54b so that the inner end 52b, 54b of each rod is on a side of the imaginary vertical plane lying on longitudinal axis L opposite to its corresponding outer end 52a, 54a. The rods thus may pivot vertically about tower bracket 24c independently of each other.

The arrangements shown permit one to arrange the torque rods at or near 40° to a 45° angle $\theta$ (an 80° to a 90° splay angle) while at the same time providing for the use of relatively long rods having a substantial effective length ($l$) (FIG. 1). The suspension is therefore symmetrical, and the transverse and longitudinal forces are shared equally by the brackets 24d attached to chassis 11. The tower bracket 24c rigidly secured to the top of each axle by flanges 24e travels in a substantially straight line as viewed from the front or rear.

The main advantages of the suspension improvement described may be summarized as follows:

1. The use of cross-over upper torque rods, set at a suitable angle, for example about 40° for a truck chassis and at about 45° for a trailer chassis, to the longitudinal centre line of the vehicle as seen in plan view, permits the use of reasonably long rods which can still be located within the confines of most truck and trailer chassis.

2. The suspension is geometrically symmetrical so that the vehicle axles do not move laterally in arcs as they move up and down relative to the chassis.

3. Stresses are minimized as the longitudinal and transverse loads are distributed equally between the brackets and spread over associated frame parts on opposite sides of the vehicle chassis.

4. In effect, the suspension provides a new way of achieving substantially straight line travel with links or rods.

It will be understood that modifications can be made in the embodiment of the invention illustrated and described herein without departing from the scope and purview of the invention as defined by the appended claims.

What I claim as new and desire to protect by Letters Patent of the United States is:

1. An axle suspension system for load carrying vehicles including a load carrying chassis defining a central longitudinal axis, axle means positioned transversely across said chassis and adapted to carry wheels at the outer ends thereof, resilient means between said axle means and the chassis for transmitting vertical loadings therebetween, torque rod means flexibly connected between said axle means and said chassis for resisting transverse and longitudinal loads imposed upon said axle means; said torque rod means including a first pair of rods disposed generally below the level of the axle means and a second pair of rods above such level and wherein the rods of one of said pairs are arranged in splayed outwardly angled relation with respect to said longitudinal axis of the chassis with each of said outwardly angled rods having an outer end flexibly connected to said chassis and an inner end flexibly connected to said axle, characterized in that said outwardly angled rods cross one another between their respective inner and outer ends so that the inner end of each rod is on a side of a vertical plane lying in said longitudinal axis opposite to that of its outer end with said outwardly angled rods being arranged to avoid interference with one another during vertical travel of said axle means relative to said chassis.

2. The suspension of claim 1 wherein said outwardly angled rods are located at a level above said axle means.

3. The suspension of claim 2 wherein said inner ends of the outwardly angled rods are connected to said axle means at a level corresponding to the roll center of the chassis relative to said axle means.

4. The suspension of claim 1, 2 or 3 wherein one of said outwardly angled rods is curved in a vertical plane in one direction while the other of said outwardly angled rods is curved in a vertical plane in the opposite direction whereby interference between them is avoided.

5. The suspension according to claim 1 being a tandem axle suspension, said axle means comprising a pair of spaced axles, with each of said axles having both said first and said second pair of rods respectively connected thereto with said resilient means between said axle means and the chassis including equalizing beam means extending longitudinally on each side of said chassis between end portions of said axles and suspension spring means interposed between said chassis and said equalizing beams which are both axially compressible and capable of flexure to permit the equalizing beam means to tilt and follow the vertical movements of said axles.

6. The suspension of claim 5 wherein said outwardly angled rods are located at a level above said axles.

7. The suspension of claim 6 wherein said inner ends of the outwardly angled rods are connected to said axles at a level corresponding to the roll center of the chassis relative to said axle.

8. The suspension of claim 2, 3 or 6 wherein said inner ends of said rods are connected to said axle at the same level via an upstanding post rigidly affixed at the midpoint of such axle.

9. The suspension of claim 1, 2 or 5 wherein said outwardly angled rods are at equal angles relative to said longitudinal axis.

10. The suspension of claim 1, 2 or 5 wherein said outwardly angled rods have an included angle between them of from about 80° to about 90°.

11. The suspension of claim 5, 6 or 7 wherein one of said outwardly angled rods is curved in a vertical plane in one direction while the other of said outwardly angled rods is curved in a vertical plane in the opposite direction whereby interference between them is avoided.

12. The suspension of claim 5, 6 or 7 wherein said outwardly angled rods are at equal angles relative to said longitudinal axis at an included angle between the outwardly angled rods of from about 80° to about 90° and wherein one of said outwardly angled rods is curved in a vertical plane downwardly while the other of said outwardly angled rods is curved in a vertical plane upwardly whereby interference between them is avoided.

13. The suspension of claim 1, 2 or 3 wherein one of said outwardly angled rods has a vertically elongated opening formed therein for loosely receiving the other rod for vertical travel therein whereby interference between the said rods is avoided.

* * * * *